June 30, 1942.    T. B. HYDE    2,288,243
INDICATOR APPARATUS
Filed Jan. 9, 1941

INVENTOR
THOMAS BERTRAM HYDE
BY
ATTORNEY

Patented June 30, 1942

2,288,243

UNITED STATES PATENT OFFICE 2,288,243

INDICATOR APPARATUS

Thomas Bertram Hyde, Chelmsford, England, assignor to Radio Corporation of America, a corporation of Delaware Application January 9, 1941, Serial No. 373,777
In Great Britain January 30, 1940

3 Claims. (Cl. 88—24)

The present invention relates to apparatus for measuring or indicating the angle of rotation of a rotatable spindle, and finds particular, though not exclusive, use in short wave radio apparatus in which a high ratio of velocity is provided between a tuning handle and an adjustable reactance. The invention makes use of the well known principle of the optical lever.

According to the invention, an indicator apparatus for measuring or indicating the angle of rotation of a rotatable spindle comprises a spindle having rigidly fixed to or associated with it, a plurality of plane-reflecting surfaces having their reflecting faces passing through the center of rotation of the spindle, the several reflecting surfaces being angularly disposed relatively to each other through equal angles, and also being laterally disposed; a source of light; a hair-line, means for focussing an image of said hair-line on to said surfaces; and a scale having a plurality of sub-scales placed one above another, the whole arrangement being such that images of the spot of light and hair-line are reflected by the said surfaces on to, and caused to travel across, the scales in turn.

Where the invention is applied to a short wave radio receiver tuning apparatus having friction drive, it may be necessary to indicate the angle of rotation from 0° to only 180° in which case it will suffice if, say, four reflecting surfaces are provided and are angularly disposed by 45°.

Figure 2:
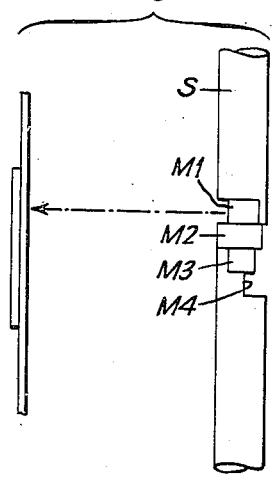
Figure 1:
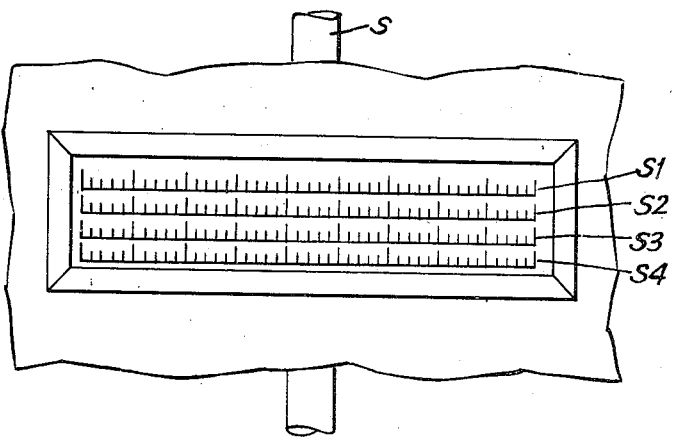
Figure 3:
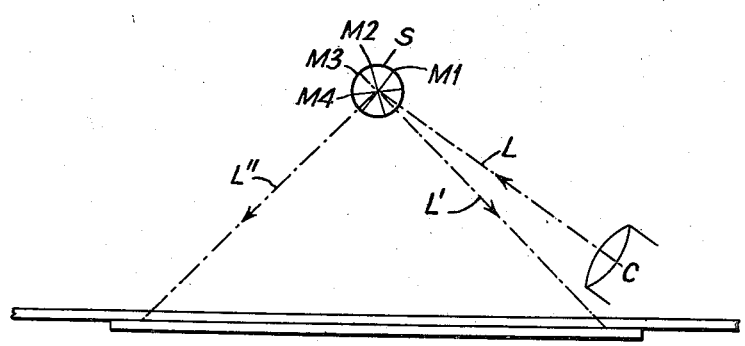

The invention is illustrated in the accompanying drawing in which Figs. 1, 2 and 3 are front, side and plan views respectively of a preferred form of indicating apparatus. In these figures S is a rotatable spindle on which are ground, or otherwise suitably provided, a plurality of, in the case illustrated four, plane reflecting surfaces M1, M2, M3, M4, situated one above the other along the length of the spindle. These plane surfaces pass through the axis of the spindle, and are angularly displaced from each other by equal angles. In the example illustrated, it is to be supposed that the limit of the extent of rotation of the spindle is 180°. To this end, with four reflective surfaces, the angular displacement is 45°. In front of the spindle is a translucent scale panel having produced thereon, as for example by engraving, four scales S1, S2, S3, S4, arranged one above the other. This scale panel may be, as shown, planar or curved in which latter case it would, preferably, be of arcuate form on a curve described around the axis of the spindle as center. C represents a collimator from which a beam of light L proceeds to one of the reflecting surfaces and this beam is reflected (L' or L") from one of the mirrors (M1 or M4). The beam L carries an umbiferous hair line. In the example shown, it may be supposed that the scale marking at the right of scale S1 corresponds to zero rotation of the spindle and that the scale marking at the left of scale S4 corresponds to 180° of rotation.

In operation, as the spindle is rotated the first reflecting surface (e. g. mirror) reflects the beam of light so that the spot of light traverses the entire length of the first scale S1, after which the next mirror M2 reflects the spot along the next scale S2, the lateral displacement between successive travels of the spot being effected by the relative positions of the mirrors along the spindle.

By choosing a suitable number of mirrors and a sufficient distance between the mirrors and the scale, the rotation of the spindle may be made to cause the spot of light to travel over a very great length of scale.

To ensure accurate readings, the source of light, the spindle and the scale are mounted rigidly with respect to one another.

The invention is susceptible of modification. Thus the effect of lateral displacement of the reflected beams of light may be obtained by inclining the planes of the mirrors relatively to the axis of the spindle. Moreover, the scale panel may be made opaque and the scales may be read from the spindle side thereof.

When the apparatus is to be used in, for example, high power transmitters a long beam of light may be used to give a very long scale on the front of the transmitter for reading a high voltage instrument placed at the rear, thus securing a long scale, and, since there is no mechanical or electrical connection between the spindle and the scale, personal safety.

Having now particularly described and ascertained the nature of my said invention and in what manner the same is to be performed I declare that what I claim is:

1. An indicator apparatus for measuring or indicating the angle of rotation of a rotatable member which is adapted for adjustment between two limiting positions through a range of substantially 180°, comprising a spindle coupled to the rotatable member and having rigidly fixed to or associated with it, a plurality of plane-reflecting surfaces having their reflecting faces passing through the axis of rotation of the spindle, the several reflecting surfaces being laterally disposed in the direction of the spindle axis and also angularly disposed relatively to each other through equal angles determined by the ratio of the range of adjustment and the number of reflecting surfaces; a source of light; a hair-line; means for focussing an image of said hair-line onto said surfaces; and a scale having a plurality of sub-scales equal to the number of plane reflecting surfaces placed one above another, the arrangement being such that images of the spot of light and hair line are reflected by only one of said surfaces at a time onto its corresponding sub-scale, said images being caused to travel across the several scales in sequence during the rotation of the rotatable member from one limiting position to another.

2. An indicator apparatus as defined in claim 1 wherein there are provided four sub-scales and four reflecting surfaces, the latter being displaced from each other in the direction of spindle rotation by 45°.

3. Apparatus for indicating the rotative position of a radio tuning device, comprising a stationary translucent scale which is sub-divided into a plurality of elongated sections disposed in parallel, a rotary shaft disposed to the rear of the scale and at right angles to the length thereof operatively connected to said tuning device, a plurality of plane reflecting surfaces having their reflecting faces passing through the axis of rotations of the shaft, the several reflecting surfaces being laterally disposed in the direction of the shaft axis and also angularly disposed relatively to each other through equal angles, and means including a source of light and a hair-line for focusing an image of said hair-line onto said surfaces, the arrangement being such that the reflected image from one of the surfaces is caused to pass from one end to the other of one of said scale sections in response to adjustment of said tuning device through a predetermined angle in one direction and the reflected image from a second surface is caused to pass from one end to the other of a second of said scale sections in response to a further adjustment of said tuning device in the same direction.

THOMAS BERTRAM HYDE.